(12) United States Patent
Poilvé

(10) Patent No.: US 11,416,968 B2
(45) Date of Patent: Aug. 16, 2022

(54) METHOD FOR INCREASING THE SPATIAL RESOLUTION OF A MULTISPECTRAL IMAGE FROM A PANCHROMATIC IMAGE

(71) Applicant: AIRBUS DS GEO SA, Toulouse (FR)

(72) Inventor: Hervé Poilvé, Pechabou (FR)

(73) Assignee: AIRBUS DS GEO SA, Toulouse (FR)

( * ) Notice: Subject to any disclaimer, the term of this patent is extended or adjusted under 35 U.S.C. 154(b) by 91 days.

(21) Appl. No.: 17/055,104

(22) PCT Filed: May 22, 2019

(86) PCT No.: PCT/FR2019/051171
§ 371 (c)(1),
(2) Date: Nov. 12, 2020

(87) PCT Pub. No.: WO2019/224482
PCT Pub. Date: Nov. 28, 2019

(65) Prior Publication Data
US 2021/0125308 A1 Apr. 29, 2021

(30) Foreign Application Priority Data
May 22, 2018 (FR) ...................... 18 54233

(51) Int. Cl.
*G06T 3/40* (2006.01)
*G06T 5/20* (2006.01)
(Continued)

(52) U.S. Cl.
CPC ............ *G06T 3/4061* (2013.01); *G06T 5/003* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS

| 6,011,875 | A | * | 1/2000 | Laben | ................. G06T 5/003 |
|---|---|---|---|---|---|
| | | | | | 382/254 |
| 6,097,835 | A | * | 8/2000 | Lindgren | ................. G06T 5/50 |
| | | | | | 382/162 |
| 10,810,704 | B2 | * | 10/2020 | Poilve | ................. G06V 20/13 |

(Continued)

FOREIGN PATENT DOCUMENTS

WO  WO-2012171185 A1 * 12/2012 ......... G02B 27/1013

OTHER PUBLICATIONS

Miloud Chikr El-Mezouar. Fusion d'images en télédétection satellitaire. Environmental Engineering. INSA de Rennes; Université Djillali Liabes de Sidi Bel Abbès, 2012. English. ffNNT : D12-31ff. fftel00922646 (Year: 2012).*

(Continued)

*Primary Examiner* — Emily C Terrell
*Assistant Examiner* — Nathan J Bloom
(74) *Attorney, Agent, or Firm* — Im IP Law; Chai Im; C. Andrew Im

(57) ABSTRACT

A method for increasing spatial resolution of a MS image using a PAN image. For a portion of the scene, values of parameters of a scene model are obtained according to a resemblance between a simulated MS reflectance and the MS reflectance. A relative variation in the simulated MS reflectance is determined with respect to a simulated PAN reflectance near the values of parameters obtained. A difference between the PAN reflectance and a reflectance of a PAN image with reduced spatial resolution is estimated. An MS image with increased spatial resolution is determined, by adding to the MS reflectance a correction corresponding to a product of this difference and this relative variation. A corresponding image-processing system is also provided.

15 Claims, 4 Drawing Sheets

Figure 1:
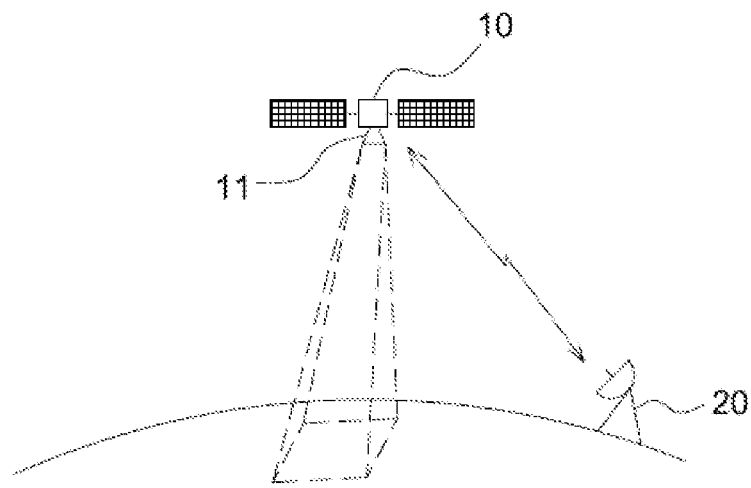

(51) Int. Cl.
*G06T 5/50* (2006.01)
*G06T 5/00* (2006.01)

(52) U.S. Cl.
CPC ............. *G06T 2207/10036* (2013.01); *G06T 2207/10041* (2013.01); *G06T 2207/20221* (2013.01); *G06T 2207/30181* (2013.01)

(56) References Cited

U.S. PATENT DOCUMENTS

| | | | |
|---|---|---|---|
| 2008/0089558 A1* | 4/2008 | Vadon | G01C 11/06 |
| | | | 382/209 |
| 2018/0007288 A1* | 1/2018 | Klein | G06T 7/70 |
| 2019/0035146 A1* | 1/2019 | Nowicki | G01S 7/4808 |

OTHER PUBLICATIONS

Javan FD, Samadzadegan F, Mehravar S, Toosi A, Khatami R, Stein A. A review of image fusion techniques for pan-sharpening of high-resolution satellite imagery. ISPRS journal of photogrammetry and remote sensing. Jan. 1, 2021;171:101-17. (Year: 2021).*

Lolli et al., "Haze Correction for Contrast-Based Multispectral Pansharpening," IEEE Geoscience and Remote Sensing Letters, Dec. 2017, pp. 2255-2259, vol. 14, No. 12.
Garzelli et al., "Multispectral Pansharpening with Radiative Transfer-Based Detail-Injection Modeling for Preserving Changes in Vegetation Cover," May 9, 2018, pp. 1-17, www.preprints.org.
Aly et al., "A Regularized Model-Based Optimization Framework for Pan-Sharpening," IEEE Transactions on Image Processing, Jun. 1, 2014, pp. 2596-2608, vol. 23, No. 6.
Jacquemoud et al., "PROSPECT + SAIL models: a review of use for vegetation characterization," Remote Sensing of Environment, Sep. 2009, pp. S56-S66, vol. 113, supplement 1.
Babin et al., "Variations in the light absorption coefficients of phytoplankton, nonalgal particles, and dissolved organic matter in coaster waters around Europe," J. Geophys. Res., Jul. 2, 2003, pp. 4.1-4.20, vol. 108, No. 3211.
Kneizys et al., "Users Guide to LOWTRAN 7," Environmental Research Papers, Aug. 16, 1988, pp. 1-137, Air Force Geophysics Lab Hanscom AFB MA.
Jing et al., "An image fusion method taking into account phenological analogies and haze," International J. Remote Sensing, Mar. 16, 2011, pp. 1675-1694, vol. 32, No. 6.
Amro et al., "A survey of classical methods and new trends in pansharpening of multispectral images," Eurasip J. Advances Signal Proc., Dec. 1, 2011, pp. 1-22, vol. 2011, No. 1.

* cited by examiner

METHOD FOR INCREASING THE SPATIAL RESOLUTION OF A MULTISPECTRAL IMAGE FROM A PANCHROMATIC IMAGE

RELATED APPLICATIONS

This application is a § 371 application of PCT/FR2019/051171 filed May 22, 2019, which claims priority from French Patent Application No. 18 54233 filed May 22, 2018, each of which is incorporated herein by reference in its entirety.

TECHNICAL FIELD

The present invention belongs to the field of processing of images acquired by an optical observation instrument on board a spacecraft, such as a satellite, or an aircraft moving at high altitude, and relates more particularly to a method for increasing spatial resolution of a multispectral image using a panchromatic image having a spatial resolution greater than that of the multispectral image.

BACKGROUND OF THE INVENTION

Indeed, very high spatial resolution optical observation satellites generally acquire pairs of images of the same scene, formed by a multispectral image of the scene, called "MS image", and a panchromatic image of said scene, called "PAN image".

The MS image is in practice itself formed by at least two elementary images, corresponding to measurements carried out in different respective bands of wavelengths. For example, an MS image can consist of four elementary images:
- an elementary image in the band of the red wavelengths (for example [625-695] nanometres),
- an elementary image in the band of the green wavelengths (for example [530-590] nanometres),
- an elementary image in the band of the blue wavelengths (for example [450-520] nanometres),
- an elementary image in the band of the near-infrared wavelengths (for example [760-890] nanometres).

The PAN image is an image in a band of wavelengths wider than those of the elementary images of the MS image, which covers for example directly all the visible wavelengths. The PAN image has the highest spatial resolution produced by the optical observation satellite, while the spatial resolution of the MS image is lesser, generally reduced by a simple factor (2 or 4) with respect to that of the PAN image. Therefore, the PAN image generally has a spatial sampling distance (SSD, or Ground Sampling Distance or GSD) smaller than that of the MS image. Thus, the scene includes a greater number of pixels in the PAN image than in each of the elementary images of the MS image, so that a pixel in the PAN image represents a smaller surface area of the scene than a pixel of an elementary image of the MS image.

For a better possible use of this pair of MS and PAN images, various methods, known by the name of PAN-sharpening, have been developed to increase the spatial resolution of the MS images using the PAN images.

The goal of the known methods is mainly to provide a visual rendering in true colours. These known methods, such as the Gram-Schmidt method, are not focused on the physical reality of the measurement as it can be expressed in reflectance values. In other words, the MS images obtained after increase of spatial resolution are not always realistic in that they can be substantially different from what they would have been if they had been directly acquired with the same spatial resolution as the PAN image.

The article "Haze Correction for Contrast-Based Multispectral Pansharpening" by S. Lolli, L. Alparone, A. Garzelli and G. Vivone, IEEE Geoscience and Remote Sensing Letters, vol. 14, no. 12, December 2017, discloses a PAN-sharpening method based on an atmospheric model. The path radiance, which corresponds to an energy diffused by various atmospheric components before reaching the opening of an instrument without being reflected by the surface of the Earth, appears as a haze disturbing the representations in the MS bands. According to the solutions developed here, this path radiance is estimated and subtracted from each band before spatial modulation on the basis of the PAN image, then reinserted after fusion.

In the article "Multispectral Pansharpening with Radiative Transfer-Based Detail-Injection Modeling for Preserving Changes in Vegetation Cover" by A. Garzelli, N. Aiazzi, L. Alparone, S. Lolli and G. Vivone, XP055538580, May 9, 2018, a PAN-sharpening method is described that takes advantage of a correction of the radiance term introduced by the atmosphere, during the fusion step, on the basis of techniques of empirical estimation or based on models.

The article "A Regularized Model-Based Optimization Framework for Pan-Sharpening" by H. A. Aly and G. Sharma, IEEE Transactions on Image Processing, vol. 23, no. 6, Jun. 1, 2014, discloses a PAN-sharpening technique based on the minimisation of an objective function comprising the sum of squared residual errors in physically motivated observation models of MS images and of a PAN image, and a correlation-dependent regularization term.

Improvements are, however, possible in terms of flexibility of taking into account the spatial variations in reflectance.

OBJECT AND SUMMARY OF THE INVENTION

The goal of the present description is to overcome all or a part of the limitations of the solutions of the prior art, in particular those mentioned above, by proposing a solution that allows to increase the spatial resolution of an MS image using a PAN image in a more realistic manner than the solutions of the prior art.

For this purpose, and according to a first aspect, the description relates to a method for increasing spatial resolution of an MS image using a PAN image having a spatial resolution greater than the spatial resolution of the MS image, said MS image consisting of pixels representative of the MS reflectance of a scene, said PAN image consisting of pixels representative of the PAN reflectance of said scene. The method for increasing spatial resolution includes, for at least a portion of said scene:
- obtaining particular values of parameters of a scene model, this scene model allowing to simulate a reflectance of the scene portion in bands of wavelengths corresponding to the MS image and to the PAN image, respectively called simulated MS reflectance and simulated PAN reflectance, according to hypotheses associated with the parameters on this scene portion, the particular values of parameters being obtained according to a resemblance between the simulated MS reflectance and the MS reflectance for this scene portion,
- determining a relative variation in the simulated MS reflectance with respect to the simulated PAN reflectance near the particular values of parameters,
- estimating a difference between the PAN reflectance and a reflectance of a PAN image with reduced spatial resolution, this difference being called high spatial resolution PAN modulation, determining an MS image with increased spatial resolution, by adding to the MS reflectance a correction corresponding to a product of the high spatial resolution PAN modulation and this relative variation.

The wording "Obtaining" values is understood throughout the present application as a step allowing to obtain these values, in particular by determination or by reception.

The wording "Determining" is understood through the present application as obtaining by active operations, in particular by calculation, extraction (for example from function tables), derivation or machine learning (for example via neural networks or a partitioning into k-means).

As disclosed below, the particular values of parameters can in particular correspond to a maximisation of the resemblance between the simulated MS reflectance and the MS reflectance. In other modes, they can correspond to correspondences between the simulated MS reflectance and the MS reflectance obtained by machine learning.

Surprisingly, the MS image with increased spatial resolution can be determined by simulating the relative variation in the MS reflectance with respect to the PAN reflectance, in both its MS reflectance and PAN reflectance components, on the basis of a parameterised scene model.

In advantageous embodiments, this method can provide greater flexibility, both to represent observed physical realities with a desired degree of precision and to simulate fictional situations. Moreover, in specific embodiments, the method can make possible embodiments that are relatively simple and economical with respect to existing solutions, via a dual use of the parameterised scene model, both for the MS reflectance and for the PAN reflectance.

For example, the method for increasing spatial resolution includes, for at least a portion of the scene:

determining values of parameters of a scene model allowing to optimally parameterise said scene model with respect to the MS reflectance of the MS image, called "optimal MS values", determining a gradient of the values of the parameters allowing to optimise the parameterisation of the scene model with respect to a PAN reflectance determined according to the scene model and the optimal MS values, called "optimisation gradient", representative of the variation in the values of the parameters with respect to the variation in PAN reflectance, determining an injection vector representative of the variation in MS reflectance associated with the variation in PAN reflectance for the scene portion considered, according to the scene model and the optimisation gradient.

The method for increasing spatial resolution further includes a calculation of an MS image with increased spatial resolution according to the MS image, the PAN image and the injection vector.

The wording "Optimally parameterise" or "optimise" means an optimisation of the digital type, and not necessarily mathematical. In other words, the result of the optimisation is not necessarily an optimum, but results from optimisation operations delineated by one or more thresholds, for example a desired level of convergence, a number of iterations or a level of precision.

Thus, the method for increasing spatial resolution uses a scene model. Such scene models are known and allow to simulate the reflectance for various hypotheses made on the scene portion observed. These hypotheses correspond to various values of parameters of the scene model, the parameters allowing to describe the elements of various natures present in the scene portion observed (ground, plant cover, water, etc.), as well as characteristics of said scene portion observed (brightness, shade, pigmentation, etc.). Such scene models allow to simulate the reflectance in any band of wavelengths, including the respective bands of wavelengths of the PAN image and of the elementary images of the MS image, while taking into account the specificities specific to each of said bands of wavelengths considered. Indeed, the measured reflectance of a portion of a scene is not the same in all the bands of wavelengths, and depends in particular on the various elements present in the scene portion observed and the characteristics of said scene portion.

The method for increasing spatial resolution uses the scene model to determine how the variations in PAN reflectance, observed in the PAN image, must be injected into the MS image to obtain an MS image with increased spatial resolution that conforms more to the physical reality of the measurement.

In specific embodiments, for the estimation of the high spatial resolution PAN modulation, the PAN image with reduced spatial resolution has a spatial resolution corresponding to the spatial resolution of the MS image.

In alternatives, the spatial resolutions differ. For example, for the PAN image with a reduced spatial resolution an effective resolution a little lower than that of the MS image is chosen while going back to a sampling distance corresponding to that of the MS image. A slightly reinforced PAN modulation factor is thus obtained, which allows to implicitly integrate factors of imprecision or of approximation in the running of the operations.

In specific embodiments, obtaining the particular values of parameters comprises for the scene portion considered an optimised parameterisation of the scene model with respect to the resemblance between the simulated MS reflectance and the MS reflectance.

More particularly, the method for increasing spatial resolution can use the MS image, at least, to determine optimal MS values of the parameters of the scene model for the scene portion considered. Indeed, the MS image, although having a spatial resolution lower than that of the PAN image, contains more information on the spectral behaviour of the scene portion than the PAN image. Consequently, the use of the MS image allows to obtain values of the parameters of the scene model (optimal MS values) that allow to model the spectral behaviour of the scene portion in a more precise manner than by using only the PAN image. The optimal MS values thus correspond to an operating point of the scene model, the location of which is then chosen to determine, on the basis of the scene model, how the variations in PAN reflectance must be injected into the MS image.

In an alternative approach, the determination of the particular values of parameters corresponding to the MS image is carried out not by an optimisation method (minimisation of a criterion), but by the use of a neural network allowing to directly translate the MS reflectance into values of the set of the parameters of the model. The learning of this neural network can be carried out by scanning the entire range of the expected values for each of the parameters on the type of scene observed, and by using corresponding spectral values of the MS image simulated using the model.

According to specific embodiments, the determination of the relative variation in the simulated MS reflectance with respect to the simulated PAN reflectance comprises:

determining a gradient of values of parameters of the scene model with respect to the simulated PAN reflectance near the simulated PAN reflectance corresponding to the particular values of parameters, called reference simulated PAN reflectance, determining a variation in the simulated MS reflectance according to the values of parameters near the particular values of parameters, composing the variation in the simulated MS reflectance and the gradient of the values of parameters, giving the relative variation in the simulated MS reflectance with respect to the simulated PAN reflectance.

The determination of the gradient can in particular comprise for the scene portion considered an optimised parameterisation of the scene model with respect to a resemblance between the simulated PAN reflectance and a vicinity of the reference simulated PAN reflectance.

For example, once the optimal MS values have been determined, the scene model can be used to determine the optimisation gradient. The optimisation gradient is representative of the variation in the values of the parameters of the scene model relative to the variation in PAN reflectance, near the simulated PAN reflectance provided by the scene model for the optimal MS values (that is to say near the aforementioned operating point determined on the basis of the MS image).

On the basis of the optimisation gradient, the scene model can be used to determine the injection vector. The injection vector allows to model, given the optimal MS values determined for the scene model that allow to simulate the physical reality of the measurement in all the bands of wavelengths, how a variation in PAN reflectance must affect the MS reflectance of the MS image.

In specific embodiments, the method for increasing spatial resolution can further include one or more of the following features, taken alone or according to all the technically possible combinations.

In specific embodiments, the calculation of the MS image with increased spatial resolution includes:

a spatial oversampling of the MS image so as to obtain an MS image with a spatial sampling distance smaller than the initial spatial sampling distance, called "oversampled MS image", low-pass filtering of the PAN image so as to obtain a PAN image with reduced spatial resolution, a correction, in the scene portion, of the oversampled MS image according to the relative variation and the high spatial resolution PAN modulation, for example according to the injection vector, the PAN image and the PAN image with reduced spatial resolution.

The low-pass filtering of the PAN image allows to obtain a PAN image with reduced spatial resolution while preserving its initial spatial sampling distance, that is to say an estimation of what the PAN image would have been if it had been acquired with the same spatial resolution as the MS image, then oversampled. By comparing the PAN image and the PAN image with reduced spatial resolution, it is therefore possible to estimate a high spatial resolution modulation of the PAN reflectance of the PAN image, that is to say the part of the PAN reflectance of the PAN image that was only able to be measured because the spatial resolution of the PAN image is greater than that of the MS image.

Then, the injection vector(s) calculated allow to convert the high spatial resolution modulation of the PAN reflectance into high spatial resolution modulation of the MS reflectance corresponding to the physical reality of the measurement.

In specific embodiments, the determination of the optimisation gradient implements a Gauss-Newton algorithm.

According to a specific embodiment, the optimised parameterisation comprises, for the scene portion considered, an optimisation of a cost function including:

a first term, called "reflectance function", representative of a resemblance between the vicinity of the reference simulated PAN reflectance and the simulated PAN reflectance for the values of parameters considered, and a second term, called "function of a priori knowledge", representative of a resemblance between the values of parameters considered and an a priori knowledge of the parameters of the scene model.

In a specific mode of implementation of this embodiment, the a priori knowledge of the parameters of the scene model is dependent on the particular values of parameters.

In specific embodiments, the optimisation gradient is determined by optimisation of a cost function including at least a first term, called "reflectance function", representative of a resemblance, for the scene portion considered, between the PAN reflectance determined according to the scene model and the optimal MS values and a reflectance provided by the scene model for the values of parameters considered.

In specific embodiments, the cost function further includes a second term, called "function of a priori knowledge", representative of a resemblance, for the scene portion considered, between the values of parameters considered and an a priori knowledge of the parameters of the scene model.

In specific embodiments, the a priori knowledge of the parameters of the scene model is calculated according to the optimal MS values.

In specific embodiments, the injection vector is calculated according to the optimisation gradient and according to a matrix of variation of the scene model representative of the variation in MS reflectance with respect to the variation in the values of the parameters of the scene model.

The determination of a relative variation in the reflectance of the MS image with respect to the relative variation of the PAN image at an operating point of the model corresponding to the MS reflectance considered can be obtained by other approaches, for example by learning of a neural network. It is thus possible to vary the values of parameters of the model around this operating point, and to carry out the learning of the neural network on the relative variations simultaneously observed on the MS and PAN reflectances. Once this learning has been carried out, the most probable translation of the relative variation of the PAN image in the various MS bands can be obtained by the neural network.

In specific embodiments, the scene portion corresponds to a pixel and the relative variation, which can for example take the form of an injection vector, is determined for each pixel.

In specific embodiments, the pixels being classified into groups of pixels and the scene portion corresponding to one of the groups of pixels, the relative variation, which can for example take the form of an injection vector, is determined for each group of pixels. The method can in particular include a classification of the pixels into groups of pixels.

In specific embodiments, the relative variation, which can for example take the form of an injection vector, of a group of pixels is determined according to a median value or an average value of the MS reflectances of the group of pixels considered.

In specific embodiments, the scene model includes a model of reflectance on the ground and an atmospheric model.

In specific embodiments, the method for increasing spatial resolution includes a previous conversion of the values of the pixels of the MS image and of the PAN image into values of MS reflectance and of PAN reflectance on the ground or at the top of the atmosphere.

According to a second aspect, the description relates to a computer program product including a set of program code instructions which, when they are executed by a processor, configure said processor to implement a method for increasing spatial resolution according to any one of the embodiments of the invention.

According to a third aspect, the description relates to a system for image processing by increasing spatial resolution of a multispectral image, called "MS image", using a panchromatic image, called "PAN image", having a spatial resolution greater than the spatial resolution of the MS image, the MS image consisting of pixels representative of an MS reflectance of a scene, the PAN image consisting of pixels representative of a PAN reflectance of the scene. The image-processing system includes at least one processor configured, for at least a portion of the scene, to:

obtain particular values of parameters of a scene model, this scene model allowing to simulate a reflectance of this scene portion in bands of wavelengths corresponding to the MS image and to the PAN image, respectively called simulated MS reflectance and simulated PAN reflectance, according to hypotheses associated with the parameters on this scene portion, the particular values of parameters being obtained according to a resemblance between the simulated MS reflectance and the MS reflectance for this scene portion, determine a relative variation in the simulated MS reflectance with respect to the simulated PAN reflectance near the particular values of parameters, estimate a difference between the PAN reflectance and a reflectance of a PAN image with reduced spatial resolution, this difference being called high spatial resolution PAN modulation, determine an MS image with increased spatial resolution, by adding to the MS reflectance a correction corresponding to a product of the high spatial resolution PAN modulation and the relative variation.

Said at least one processor is advantageously configured to implement a method for increasing spatial resolution according to any one of the embodiments of the method.

PRESENTATION OF THE DRAWINGS

Figure 2:
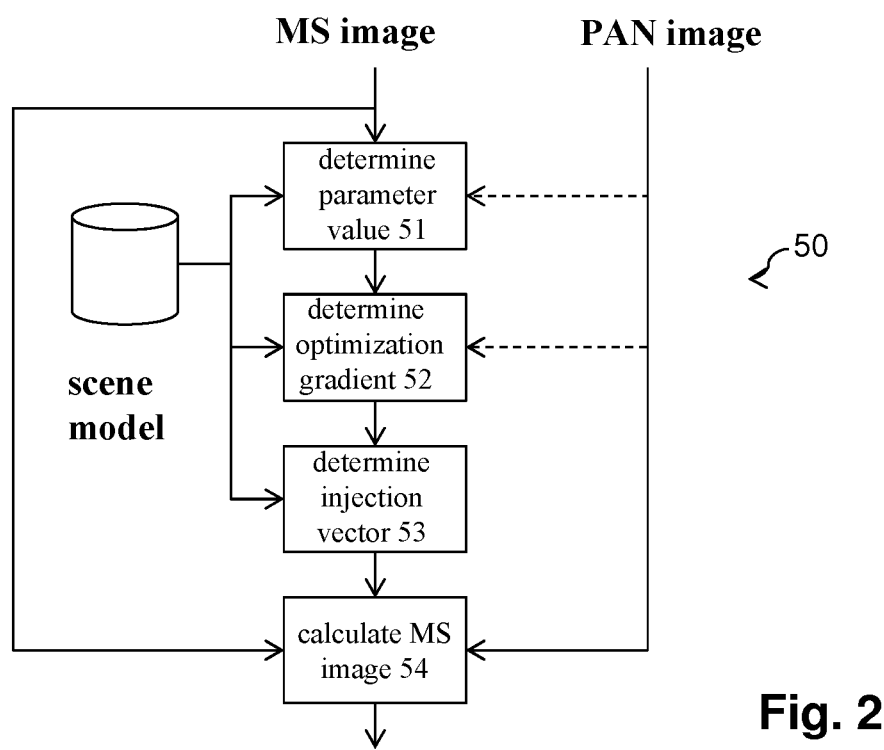
Figure 3:
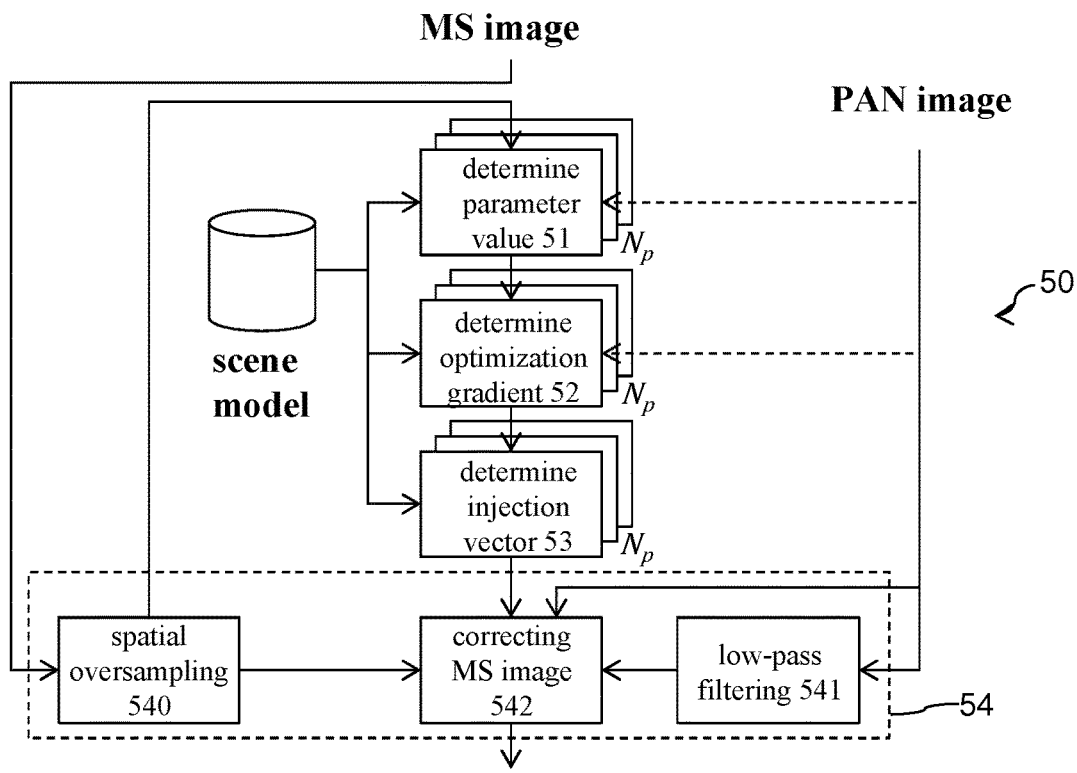
Figure 4:
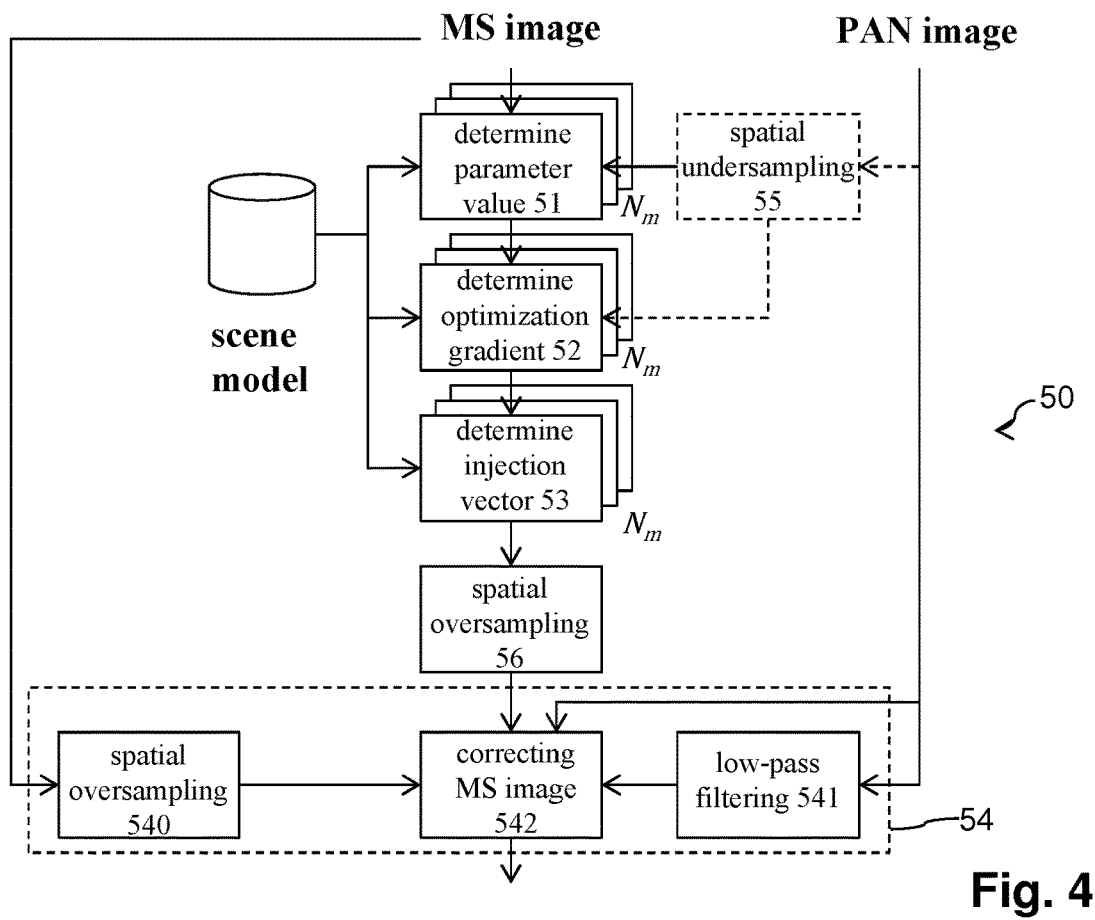
Figure 5:
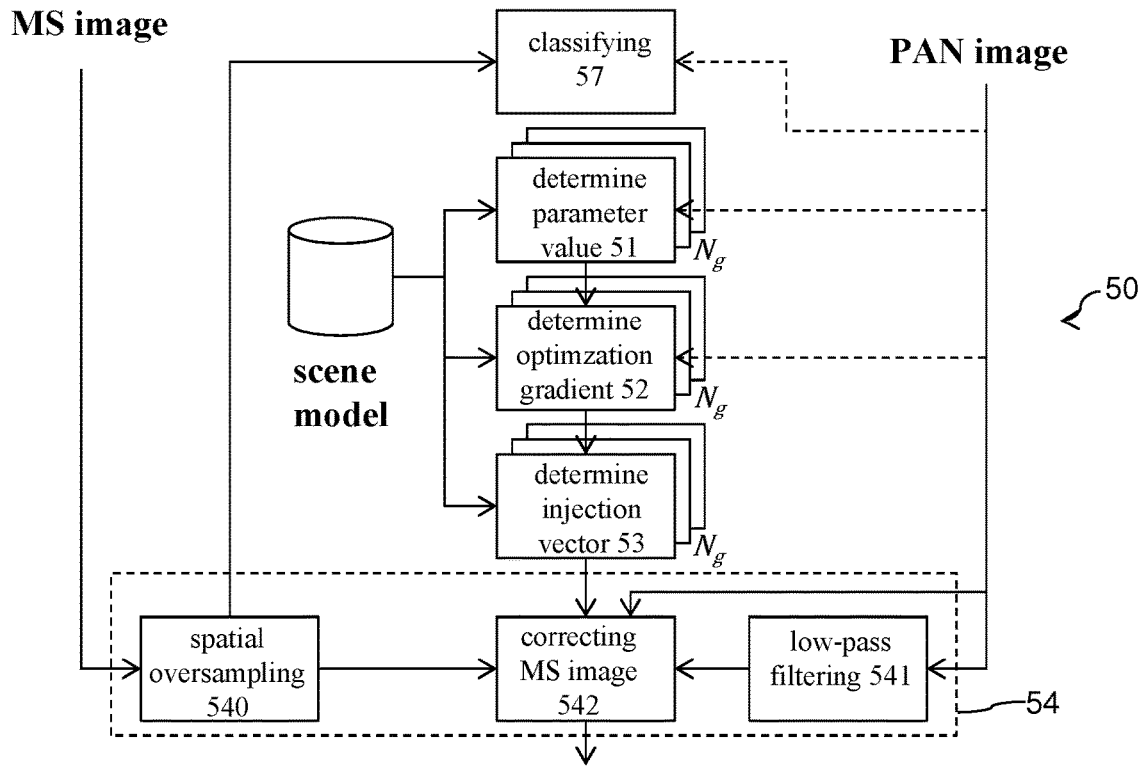
Figure 6:
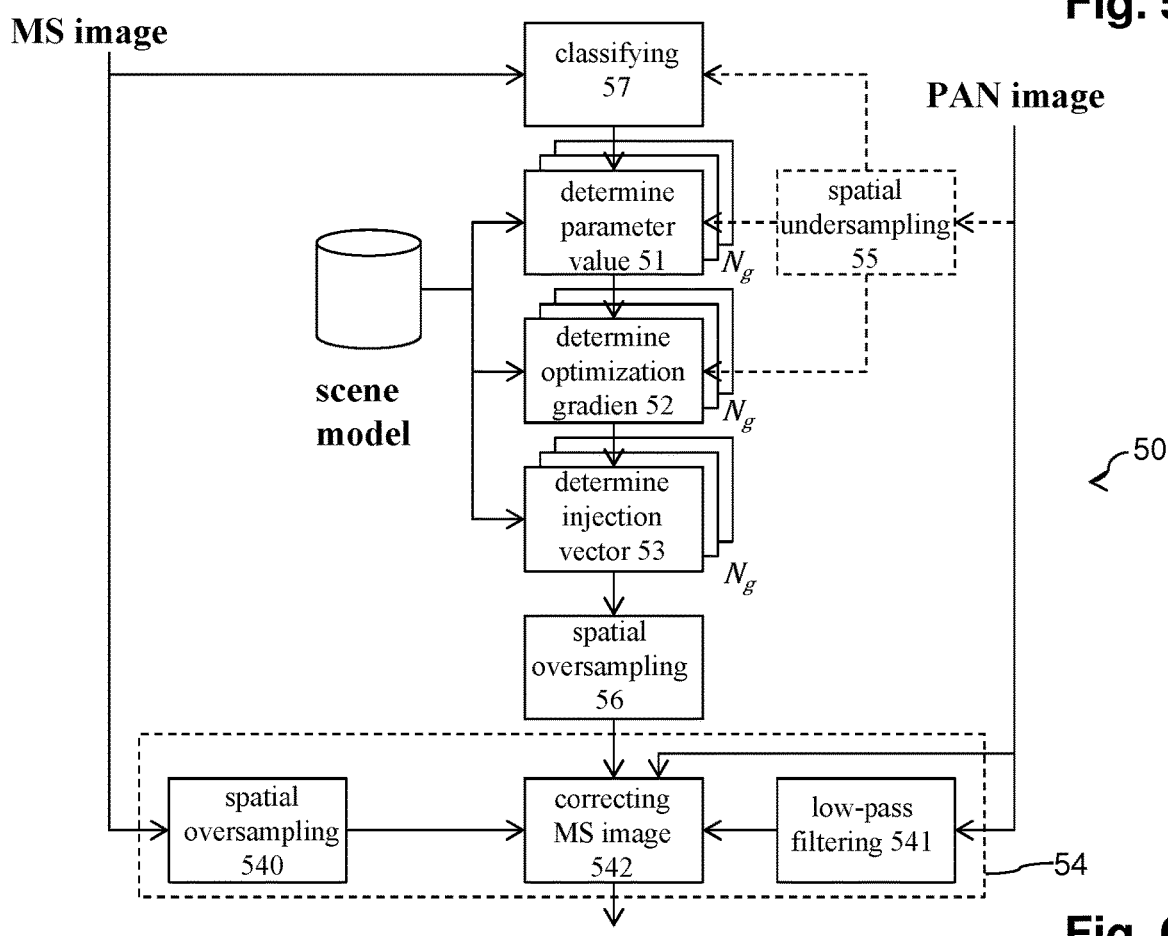
Figure 7:
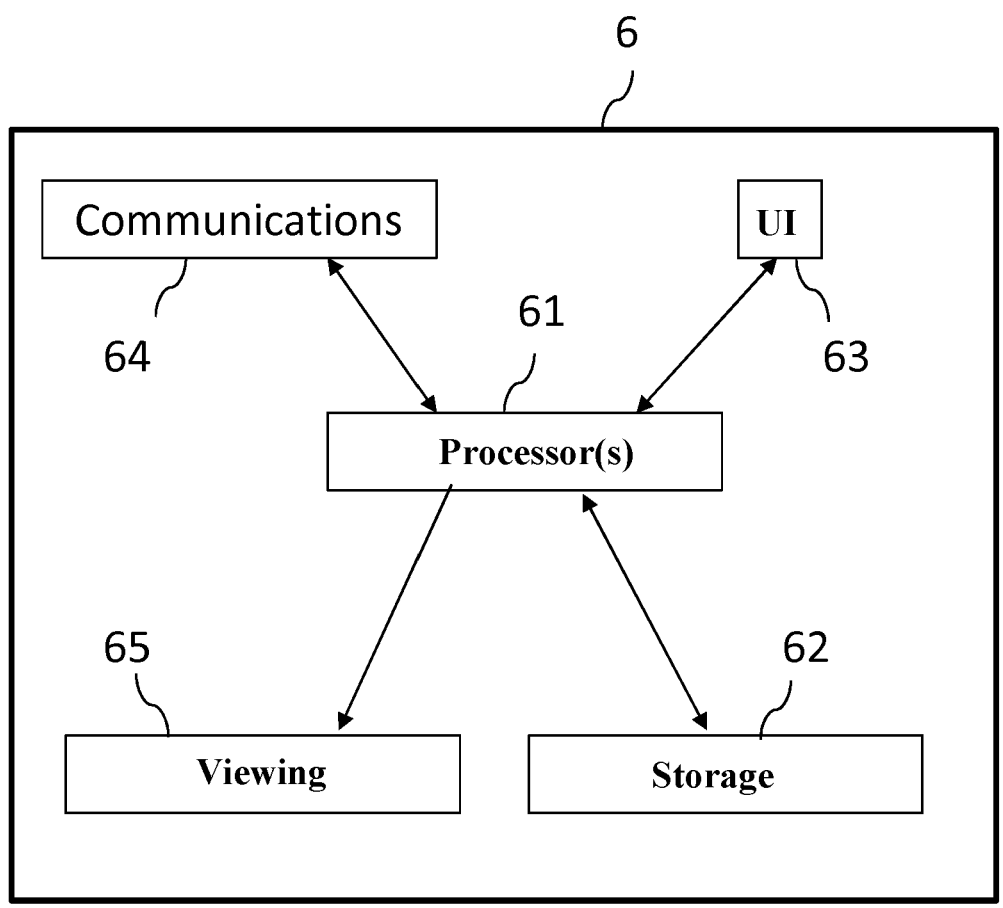

The invention will be better understood upon reading the following description, given as an example that is in no way limiting, and made in reference to the drawings which show:

FIG. 1: a diagram of an observation satellite in Earth orbit;

FIG. 2: a diagram showing the main steps of a method for increasing spatial resolution;

FIG. 3: a diagram showing a first embodiment of the method for increasing spatial resolution;

FIG. 4: a diagram showing a second embodiment of the method for increasing spatial resolution;

FIG. 5: a diagram showing a third embodiment of the method for increasing spatial resolution;

FIG. 6: a diagram showing a fourth embodiment of the method for increasing spatial resolution; and FIG. 7: a schema of a device for increasing spatial resolution corresponding to the embodiments of the method of FIGS. 2 to 6.

In these drawings, references identical from one drawing to another designate identical or analogous elements. For reasons of clarity, the elements shown are not to scale, unless otherwise mentioned.

DETAILED DESCRIPTION OF EMBODIMENTS

In the rest of the description, in a non-limiting manner, the case is considered of a processing of images acquired from a spacecraft of the satellite type. It should be specified, however, that the invention also applies to images acquired by an optical observation instrument on board an aircraft (airplane, balloon, drone, etc.), for example a high-altitude aircraft (altitude greater than 10 kilometres).

Moreover, in the rest of the description, in a non-limiting manner, the case is considered in which the optical observation instrument is adapted to simultaneously acquire a multispectral image, called "MS image", and a panchromatic image, called "PAN image", of the same scene over which said satellite flies. It should be specified, however, that the invention also applies to MS and PAN images acquired by two different optical observation instruments, which can for example be on board the same satellite or different satellites (or even in different craft, respectively spacecraft and aircraft). Consequently, the invention also applies to the case of MS and PAN images acquired at different times, as long as said images are comparable in that, in particular, they represent substantially the same scene observed with substantially the same line of sight, and preferably with substantially the same sunshine conditions.

FIG. 1 schematically shows a satellite 10 in Earth orbit, configured to observe a scene on the surface of the Earth. The Earth orbit is for example a non-stationary orbit, for example a Low Earth Orbit (or LEO) or Medium Earth Orbit (or MEO), so that the scene observed by the satellite varies over time, at least because of the movement of said satellite 10 with respect to the Earth.

Conventionally, the satellite 10 carries an optical observation instrument 11 that allows to acquire an MS image and a PAN image of the scene observed.

The MS image is in practice itself formed by a number $N_j$ of elementary images ($N_j \geq 2$), corresponding to the radiation received in different respective bands of wavelengths. For example, an MS image can consist of four elementary images ($N_j = 4$):

an elementary image in the band of the red wavelengths, called "R band" (for example [625-695] nanometres), an elementary image in the band of the green wavelengths, called "G band" (for example [530-590] nanometres), an elementary image in the band of the blue wavelengths, called "B band" (for example [450-520] nanometres), and an elementary image in the band of the near-infrared wavelengths, called "NIR band" (for example [760-890] nanometres).

The PAN image corresponds to the radiation received in a band of wavelengths for example wider than that of the elementary images of the MS image, which covers for example directly all the visible wavelengths. For example, the PAN image corresponds to the radiation received in a band of wavelengths of [450-745] nanometres.

The PAN image has a spatial resolution higher than each of the elementary images of the MS image, as well as a spatial sampling distance smaller than each of said elementary images of the MS image, so that a pixel in the PAN image represents a smaller surface area of the scene that a pixel of an elementary image of the MS image. Conventionally, the spatial resolution of an image corresponds to the size, for example expressed in metres, of the smallest object that can be detected in the scene represented by this image. The smaller the size of the smallest detectable object, the greater the spatial resolution of this image. The spatial sampling distance corresponds to the distance on the ground, for example expressed in metres, separating two adjacent pixels of the image.

Once the MS image and the PAN image have been acquired by the optical observation instrument 11 of the satellite 10, said MS and PAN images are memorised to be transmitted to a ground station 20, when the satellite 10 flies over said ground station 20. Once transmitted to a ground station 20, the MS image and the PAN image are subjected to various processing that is considered to be known to a person skilled in the art. This processing includes in particular the previous geometric correction of said MS and PAN images, for example to make them consistent with the same predetermined referencing system. The MS image and the PAN image are then provided to a processing device (not shown in the drawings) that can carry out the time-delayed processing aiming to increase the spatial resolution of the MS image using the PAN image, by implementing a method 50 for increasing spatial resolution.

The processing device includes for example a processing circuit including one or more processors and memorisation means (magnetic hard disk, electronic memory, optical disk, etc.) in which data and a computer program product, in the form of a set of program code instructions to be executed to implement all or a part of the steps of the method 50 for increasing spatial resolution, are memorised. Alternatively or in addition, the processing circuit includes one or more programmable logic circuits (FPGA, PLD, etc.), and/or one or more specialised integrated circuits (ASIC), and/or a set of discrete electronic components, etc. adapted to implement all or a part of the steps of the method 50 for increasing spatial resolution.

In other words, the processing circuits corresponds to a set of means configured in a software (specific computer program product) and/or hardware (FPGA, PLD, ASIC, etc.) manner to implement the various steps of the method 50 for increasing spatial resolution.

The processing device can include functionalities in the same apparatus or in several acting in cooperation. It can further be provided for processing on the ground, onboard processing, or a combination of the two processing modes.

The MS image consists of pixels representative of the multispectral reflectance of the scene observed in each of the $N_j$ bands of wavelengths considered, called "MS reflectance". The PAN image consists of pixels representative of the panchromatic reflectance of said scene, called "PAN reflectance".

The MS and PAN reflectances are preferably reflectances on the ground (corrected from the effects of the atmosphere, at least their predictive part—Rayleigh correction) or at the Top of Atmosphere. For this purpose, the method 50 for increasing spatial resolution can include, in preferred embodiments, a previous step (not shown in the drawings) of converting the values of the pixels of the MS image and of the PAN image into values of MS reflectance and PAN reflectance on the ground or at the top of the atmosphere, if this conversion has not already been carried out by other means. Such a conversion is considered to be known to a person skilled in the art.

FIG. 2 schematically shows the main steps of a method 50 for increasing spatial resolution of the MS image using the PAN image. As illustrated by FIG. 2, the method 50 for increasing spatial resolution includes, to increase the spatial resolution in a predetermined portion of the scene observed, steps of:

51 determining values of parameters of a scene model allowing to optimally parameterise said scene model with respect to the MS reflectance of the MS image in the scene portion considered, called "optimal MS values,"

52 determining a gradient of the values of the parameters allowing to optimise the parameterisation of the scene model with respect to a PAN reflectance determined according to the scene model and the optimal MS values, called "optimisation gradient," and 53 determining an injection vector representative of the variation in MS reflectance associated with the variation in PAN reflectance for the scene portion considered, according to the scene model and the optimisation gradient.

The above steps (51 determining optimal MS values, 52 determining an optimisation gradient and 53 determining an injection vector) are executed for a portion of the scene, and are repeated for each scene portion if the spatial resolution of the MS image must be increased in several portions of observed scene.

According to a first example, the scene portion corresponds to a pixel in high spatial resolution (that is to say the spatial resolution of the PAN image), so that the above steps are executed for each pixel in high spatial resolution considered. In other words, in such a case, an injection vector is calculated for each pixel in high spatial resolution considered, and preferably for all the pixels in high spatial resolution of the PAN image. Alternatively, the scene portion can correspond to a pixel in low spatial resolution (that is to say the spatial resolution of the MS image), so that the above steps are executed for each pixel in low spatial resolution considered. In other words, in such a case, an injection vector is calculated for each pixel in low spatial resolution considered, and preferably for all the pixels in low spatial resolution of the MS image, and an injection vector for each pixel in high spatial resolution can be obtained by oversampling the injection vectors obtained for the pixels in low spatial resolution.

According to a second example, the scene portion corresponds to a group of pixels in high spatial resolution (that is to say at the spatial resolution of the PAN image), so that the above steps are executed for each group of pixels in high spatial resolution considered. In other words, in such a case, an injection vector is calculated for each group of pixels in high spatial resolution considered, and preferably so as to cover all the pixels in high spatial resolution of the PAN image. Alternatively, the scene portion can correspond to a group of pixels in low spatial resolution (that is to say at the spatial resolution of the MS image), so that the above steps are executed for each group of pixels in low spatial resolution considered. In other words, in such a case, an injection vector is calculated for each group of pixels in low spatial resolution considered, and preferably so as to cover all the pixels in low spatial resolution of the MS image, and an injection vector for each pixel in high spatial resolution can be obtained by oversampling the injection vectors obtained for the pixels in low spatial resolution.

The method 50 for increasing spatial resolution of the MS image further includes a step 54 of calculating an MS image with increased spatial resolution according to the MS image, the PAN image and the injection vector(s).

As indicated above, the method 50 for increasing spatial resolution uses a scene model, and possible examples of scene models are described in more detail below. Moreover, detailed embodiments of the steps illustrated by FIG. 2 are described in more detail below, by considering at first an example in which the scene portion corresponds to a pixel in high spatial resolution (FIG. 3) then, secondly, examples in which the scene portion corresponds to a pixel in low spatial resolution (FIG. 4) or to groups of pixels in high spatial resolution (FIG. 5) or to groups of pixels in low spatial resolution (FIG. 6).

A) Scene Model

As indicated above, the method 50 for increasing spatial resolution uses a scene model. Such scene models are considered to be known to a person skilled in the art, and the choice of a particular scene model constitutes an alternative embodiment.

The scene model advantageously includes at least one model of ground reflectance that models the intrinsic reflectance of the scene observed. In preferred embodiments, the scene model further includes an atmospheric model that models the transfer function of the atmosphere between the scene and the satellite 10, and more particularly between the scene and the top of the atmosphere.

The reader can for example refer to the document WO 2018/210647 (inventor Hervé Poilvé), which describes various types of models of ground reflectance and of parameterised atmospheric models.

In the rest of the description, in a non-limiting manner, the case is considered in which the scene model includes both a ground reflectance model and an atmospheric model.

A.1) Model of Ground Reflectance

The model of ground reflectance is for example based on a SAIL/PROSPECT model, which models in particular the reflectance of scenes corresponding to plant cover, the plants being the main contributor in the majority of the scenes observed from a satellite 10.

The SAIL/PROSPECT model, also known by the name of PROSAIL model in the scientific literature, takes into account, conventionally, the direction of illumination of the scene by the sun as well as the look direction of the optical observation instrument (BRDF model, for Bidirectional Reflectance Distribution Function).

The SAIL/PROSPECT model has been exhaustively validated and is routinely used by the scientific community. Examples include the scientific publication: "PROSPECT+SAIL Models: A Review of Use for Vegetation Characterization" by S. Jacquemoud, W. Verhoef, F. Baret, C. Bacour, P. J. Zarco-Tejada, G. P. Asner, C. Francois and S. L. Ustin, Remote Sensing of Environment 113, pp. S56-S66.

It is also possible to enrich the model of ground reflectance for example via:

an a priori knowledge of the cover observed and of a predetermined range of plant density (ranging for example from tropical forest to semi-arid region), a water component, which implements for example a model of radiative transfer using the same formalism as the SAIL model and the optical properties of the water as characterised in potentially shallow and turbid waters, called waters of the CASE II type (see for example "Variations in the Light Absorption Coefficients of Phytoplankton, Nonalgal Particles, and Dissolved Organic Matter in Coastal Waters Around Europe", Babin et al., Journal of Geophysical Research, 108, 3211), if it is known a priori that a strong presence of water is possible in the scene observed (for example coastal zone, lakes, etc.), a predetermined spectral response of the ground, selected according to an a priori knowledge of the type of ground observed in the scene when the contribution of the ground is liable to be significant with respect to the contribution of the plant cover (mountain, desert, etc.), a modelling of other characteristics liable to influence the reflectance of the scene observed, for example such as a significant presence of burned zones, snow-covered zones, artificial surfaces having a predetermined spectral signature, etc.

A.2) Atmospheric Model

If necessary, the atmospheric model includes for example a model of the LOWTRAN type (see for example "Users Guide to LOWTRAN 7", F. X. Kneisys et al., 1988, Air Force Geophysics Lab Hanscom AFB MA) and, preferably, a cloud model.

For a model of the LOWTRAN type, the guiding parameter is generally the visibility distance, in relation to the load of aerosols. The optical properties of aerosols can be deduced from the call of the LOWTRAN model, by comparison of the results provided by said LOWTRAN model while considering on the one hand an absence of aerosols (maximum visibility) and, on the other hand, a particular type of aerosol and a reference value of the visibility distance. Thus, it is possible to establish relationships (look-up tables) between the visibility-distance parameter of the LOWTRAN model and the optical thickness of the layer of aerosols, and to use said visibility distance as a parameter of said aerosol model.

The cloud model is for example modelled as a layer of turbid medium with a Henyey-Greenstein phase function and a parameter of asymmetry adapted to the respective behaviours of aerosols and of clouds. For the cloud model, the transfer functions are for example expressed according to the 4-flux formalism as developed in the SAIL model.

The optical properties of clouds are well known and described in the literature, and can be used to parameterise the cloud model, and to establish a relationship between the optical thickness of a cloud and the apparent reflectance of said cloud, for example to use the cloud optical thickness as a parameter of the cloud model.

A.3) Selection of the Scene Model

In order to be able to process images of scenes located at different locations on the surface of the Earth, it is possible, in specific embodiments, to memorise in a database a library of scene models. Each scene model memorised in this database corresponds to a particular combination of a model of ground reflectance and an atmospheric model adapted to a particular combination of type of landscape and climatic conditions.

By classifying various zones on the surface of the Earth according to their type of landscape and their climatic conditions, it is possible to establish one or more geographic maps allowing to select, for each zone on the surface of the Earth, the scene model most adapted to the type of landscape and to the climatic conditions encountered in this zone.

Thus, the selection mainly involves, in the case in which a global library of scene models has been previously formed in a database, identifying the zone in which the scene observed is located and obtaining in the database the scene model associated with said zone.

The scene model considered is thus controlled by a set of parameters $v=(v_k)$, $k=1 \ldots N_k$ which describe both the nature of the elements present in the scene portion considered and its atmospheric conditions. Moreover, it should be noted that the scene model considered can optionally vary from one scene portion to another in the case of scene portions of very different natures.

The scene model preferably covers the entire optical range, from 0.4 micrometres to 2.5 micrometres, with a fine spectral resolution, of approximately several nanometres to several tens of nanometres. This then allows to simulate the reflectance of the scene both in the bands of wavelengths of the MS image (hereinafter "MS bands") and in the band of wavelengths of the PAN image (hereinafter "PAN band"), according to their respective spectral responses. Thus for a set of parameters v, $\rho_{model-MS}(v)$ and $\rho_{model-PAN}(v)$ hereinafter designate the simulated reflectances provided by the scene model respectively in the MS bands and in the PAN band.

B) Example of Implementation on Pixels in High Spatial Resolution

FIG. 3 schematically shows the main steps of a specific embodiment in which the scene portion considered corresponds to a pixel in high spatial resolution (that is to say at the spatial resolution of the PAN image), and in which the spatial resolution must be increased in the entire scene, that is to say that an injection vector is calculated for each pixel in high spatial resolution of the PAN image.

As illustrated by FIG. 3, the step 54 of calculating the MS image with increased spatial resolution includes, in this embodiment:

- a step 540 of spatial oversampling of the MS image so as to obtain the MS image with a spatial sampling distance smaller than the initial spatial sampling distance, called "oversampled MS image", preferably with a spatial sampling distance equal to the spatial sampling distance of the PAN image,
- a step 541 of low-pass filtering of the PAN image so as to obtain a PAN image with reduced spatial resolution while preserving its initial spatial sampling distance.

The step 54 of calculating the MS image with increased spatial resolution further includes a step 542 of correcting the oversampled MS image that is executed for each scene portion considered, that is to say in the present example for each pixel of the oversampled MS image. The correction of the oversampled MS image in a given pixel (scene portion) is carried out according to the injection vector calculated for said pixel, and the respective PAN reflectances of the PAN image and of the PAN image with reduced spatial resolution for said pixel.

B.1) Spatial Oversampling of the MS Image

In the example illustrated by FIG. 3, the step 540 of spatial oversampling of the MS image is executed before the step 51 of determining optimal MS values. In general, any method for spatial oversampling of an image known to a person skilled in the art can be implemented, and the choice of a particular method is merely an alternative embodiment. For example, the spatial oversampling can be carried out by bilinear interpolation of the MS image.

At the end of the step 540 of spatial oversampling, the number of pixel in the MS image has been increased so that a pixel of the oversampled MS image represents substantially the same surface area of the scene as a pixel of the PAN image. The spatial resolution of the oversampled MS image, despite having the same spatial sampling distance as the PAN image, is not comparable to that of the PAN image, and is still limited by the spatial resolution of initial acquisition of the MS image. The following steps of the method 50 for increasing spatial resolution aim precisely to correct, according to the PAN image, the oversampled MS image to obtain an MS image with increased spatial resolution closer to that which an MS image acquired directly with the same spatial resolution as the PAN image would have been.

B.2) Determining the Optimal MS Values

As illustrated by FIG. 3, the method 50 for increasing spatial resolution includes a step 51 of determining values of the parameters of the scene model allowing to optimise the parameterisation of said scene model with respect to the oversampled MS image, called "optimal MS values". This step 51 of determining optimal MS values aims to invert the scene model and is executed, in the example illustrated by FIG. 3, in each pixel of the oversampled MS image.

It should be noted that during the step 51 of determining optimal MS values, the parameterisation of the scene model is optimised at least with respect to the oversampled MS image. It is possible, however, according to other examples, to also consider the PAN image. In other words, it is possible to optimise the parameterisation of the scene model with respect to both the MS reflectance of the oversampled MS image and the PAN reflectance of the PAN image.

In the rest of the description, in a non-limiting manner, the case is considered in which only the oversampled MS image is taken into account for determining the optimal MS values.

As indicated above, a particular set of values of the parameters of the scene model allows to calculate, in each pixel considered, a simulated MS reflectance, which can be compared to the MS reflectance of the oversampled MS image.

For example, the optimisation aims to maximise the resemblance between the simulated MS reflectance, provided by the scene model, and the MS reflectance of the oversampled MS image, that is to say that it aims to determine the "optimal" values of said parameters that allow to obtain a maximum resemblance, for the pixel considered, between the simulated MS reflectance and the MS reflectance of the oversampled MS image. However, other types of optimisation can be considered and a process of optimisation generally includes the previous definition of a cost function to be optimised, that is to say to be minimised or to be maximised according to the type of cost function. The choice of a particular cost function is merely an alternative embodiment.

As indicated above, the cost function preferably includes a first term, called "reflectance function", which calculates a resemblance, for the pixel considered, between the simulated MS reflectance and the MS reflectance of the oversampled MS image.

In specific embodiments, the cost function can further include a second term, called "function of a priori knowledge", which calculates a resemblance, for the pixel considered, between the values of parameters considered and an a priori knowledge of the parameters of the scene model. Such arrangements allow to improve the determination of the optimal MS values, by using any a priori knowledge of the statistical distribution of the parameters of the scene model.

The cost function C used to determine the optimal MS values of the scene model can be expressed in the following form:

$$C(v; \rho_{MS(p)}) = C_1(\rho_{model-MS(p)}(v), \rho_{MS(p)}) + C_2(v; v_{prior})$$

an expression in which:
- $C_1$ corresponds to the reflectance function,
- $C_2$ corresponds to the function of a priori knowledge, optional, $\rho_{MS(p)}$ corresponds to the MS reflectance for the pixel p considered, provided by the oversampled MS image, $\rho_{model-MS(p)}(v)$ corresponds to the simulated MS reflectance for the pixel p considered, provided by the scene model for the values of parameters v, $v_{prior}$ corresponds to the a priori knowledge of the parameters of the scene model.

According to a first example, the resemblance calculated by the reflectance function $C_1$ corresponds to a quadratic deviation which can be expressed in the following form:

$$C_1(\rho_{model-MS(p)}(v), \rho_{MS(p)}) = \frac{1}{N_j}\sum_{j=1}^{N_j}(\rho_{model-MS,j(p)}(v) - \rho_{MS,j(p)})^2$$

an expression in which:

$\rho_{MS,j(p)}$ corresponds to the MS reflectance for the pixel p considered, provided by the oversampled MS image for the j-th band of wavelengths out of the $N_j$ bands of wavelengths of the MS bands (if $N_j=4$, the four bands of wavelengths are for example the bands R, G, B and NIR), $\rho_{model-MS,j(p)}(v)$ corresponds to the simulated MS reflectance for the pixel p considered, provided by the scene model for the values of parameters v and for the j-th band of wavelengths out of the $N_j$ bands of wavelengths of the MS bands.

According to a second example, the resemblance calculated by the reflectance function $C_1$ corresponds to a normalised quadratic deviation which can be expressed in the following form:

$$C_1(\rho_{model-MS(p)}(v), \rho_{MS(p)}) = \frac{1}{N_j}\sum_{j=1}^{N_j}\frac{(\rho_{model-MS,j(p)}(v) - \rho_{MS,j(p)})^2}{E((\rho_{model-MS,j} - \rho_{MS,j})^2)}$$

an expression in which $E((\rho_{model-MS,j}-\rho_{MS,j})^2)$ is an estimation of the level of precision that can be targeted in the adjustment between the scene model and the oversampled MS image. This level of precision that can be targeted is for example estimated while taking into account the radiometric noise, the precision of the radiometric calibration, etc. It is also possible to take into account an intrinsic level of precision of the scene model, which can be a predetermined fixed value.

It should be noted that, in the case in which the PAN image is also used to determine the optimal MS values, the PAN reflectance of said image can be included in the above expressions of the reflectance function $C_1$ while considering that there are $(N_j+1)$ different bands of wavelengths, and that the reflectance PAN $\rho_{PAN(p)}$ of the PAN image corresponds to the reflectance measured in the $(N_j+1)$-th band of wavelengths, which is compared to the simulated PAN reflectance $\rho_{model-PAN(p)}(v)$ for the pixel p considered, provided by the scene model for the values of parameters v considered.

The function of a priori knowledge $C_2$, optional, can for example be expressed in the following form:

$$C_2(v, v_{prior}) = \frac{1}{N_k}\sum_{k=1}^{N_k}\left(\frac{v_k - E(v_k)}{\sigma(v_k)}\right)^2$$

an expression in which $E(v_k)$ and $\sigma(v_k)$ correspond to the a priori knowledge $v_{prior}$ and respectively correspond to the average and to the standard deviation of the parameter $v_k$ ($1 \leq k \leq N_k$), for example supposed to be a random variable according to a Gaussian distribution.

In the case of a cost function C as described above, the optimisation corresponds to a minimisation of said cost function, and the optimal MS values $\hat{v}_{MS}$ for the pixel considered are those allowing to minimise said cost function:

$$\hat{v}_{MS(p)} = \underset{v}{\operatorname{argmin}}(C(v, \rho_{MS(p)}))$$

In general, any optimisation method can be implemented, and the choice of a particular method is merely an alternative embodiment. In preferred embodiments, the optimisation is carried out by using a Gauss-Newton algorithm.

B.3) Determining the Optimisation Gradient

As illustrated by FIG. 3, the method 50 for increasing spatial resolution includes a step 52 of determining a gradient of the values of the parameters allowing to optimise the parameterisation of the scene model with respect to a simulated PAN reflectance determined according to the scene model and the optimal MS values, called "optimisation gradient".

The optimisation gradient is representative, near the simulated PAN reflectance provided by the scene model for the optimal MS values, of the variation in the values of the parameters with respect to the variation in PAN reflectance, for a predetermined cost function and for the pixel in high spatial resolution considered. This step 52 of determining an optimisation gradient is executed, in the example illustrated by FIG. 3, in each pixel in high spatial resolution.

In general, any cost function can be implemented and the choice of a cost function is merely an alternative embodiment.

Everything that has been described above in section B.2 with regard to the cost function used to determine the optimal MS values also applies for the cost function to be used to determine the optimisation gradient, with the notable exception that only the PAN band is taken into account to determine the optimisation gradient (the MS bands are not taken into account to determine the optimisation gradient).

As indicated above, the cost function preferably includes a reflectance function that calculates a resemblance between PAN reflectances. To determine the optimisation gradient, a simulated PAN reflectance, provided by the scene model for the values of parameters considered, is compared to a simulated PAN reflectance determined according to the scene model and the optimal MS values.

In specific embodiments, the cost function can further include a function of a priori knowledge which calculates a resemblance, for the pixel considered, between the values of parameters considered and an a priori knowledge of the parameters of the scene model.

By designating by $\hat{\rho}_{PAN(p)} = \rho_{model-PAN(p)}(\hat{v}_{MS(p)})$ the simulated PAN reflectance provided by the scene model for the optimal MS values, and by $\delta\rho_{PAN}$ a predetermined deviation for the PAN reflectance, the cost function C' used to determine the optimisation gradient can be expressed in the following form:

$$C'(v, \hat{\rho}_{PAN(p)} + \delta\rho_{PAN}) = C'_1(\rho_{model-PAN(p)}(v), \hat{\rho}_{PAN(p)} + \delta\rho_{PAN}) + C'_2(v, v_{prior})$$

an expression in which:
- $C'_1$ corresponds to the reflectance function,
- $C'_2$ corresponds to the function of a priori knowledge, optional,
- $\rho_{model-PAN(p)}(v)$ corresponds to the simulated PAN reflectance for the pixel p considered, provided by the scene model for the values of parameters v.

According to a first example, the reflectance function $C'_1$ can be expressed in the following form:

$$C'_1(\rho_{model-PAN(p)}(v), \hat{\rho}_{PAN(p)} + \delta\rho_{PAN}) = (\rho_{model-PAN(p)}(v) - (\hat{\rho}_{PAN(p)} + \delta PAN))^2$$

According to a second example, the reflectance function $C'_1$ can be expressed in the following form:

$$C'_1(\rho_{model-PAN(p)}(v), \hat{\rho}_{PAN(p)} + \delta\rho_{PAN}) = \frac{(\rho_{model-PAN(p)}(v) - (\hat{\rho}_{PAN(p)} + \delta\rho_{PAN}))^2}{E((\rho_{model-PAN} - (\hat{\rho}_{PAN} + \delta\rho_{PAN}))^2)}$$

an expression in which $E((\rho_{model-PAN} - (\hat{\rho}_{PAN} + \delta_{PAN}))^2)$ is an estimation of the level of precision that can be targeted in the adjustment between the scene model and the simulated PAN reflectance provided by the scene model for the optimal MS values, which can be estimated as described above in reference to the step 51 of determining the optimal MS values.

The function of a priori knowledge $C'_2$, optional, can for example be expressed like above in the following form:

$$C'_2(v, v_{prior}) = \frac{1}{N_k} \sum_{k=1}^{N_k} \left(\frac{v_k - E(v_k)}{\sigma(v_k)}\right)^2$$

In preferred embodiments, the a priori knowledge of the parameters of the scene model, used during the step 52 of determining the optimisation gradient, is calculated according to the optimal MS values. In other words, the average value $E(v_k)$ and the standard deviation $\sigma(v_k)$ are estimated according to the optimal MS values. By designating by $\hat{v}_{MS,k(p)}$ the optimal MS value for the k-th parameter ($1 \leq k \leq N_k$) of the scene model, the average value $E(v_k)$ and the standard deviation $\sigma(v_k)$ are for example estimated as follows for the pixel considered:

$$E(v_k) = \hat{v}_{MS,k(p)}$$

$$\sigma(v_k) \leq K_\sigma \sqrt{\frac{1}{N_p} \sum_{t=1}^{N_p} (\hat{v}_{MS,k(p)} - \hat{v}_{MS,k(t)})^2}$$

an expression in which:
- $N_p$ corresponds to the number of pixels of the oversampled MS image,
- $K_\sigma$ is a predetermined real number, chosen for example from the interval [1, 5].

The optimisation gradient is determined by optimisation of the cost function, which aims to invert the scene model, near the simulated PAN reflectance provided by the scene model for the optimal MS values. The optimisation gradient can be determined according to any method for optimising a cost function known to a person skilled in the art, and the choice of a particular method is merely an alternative embodiment. In preferred embodiments, the optimisation gradient is determined by minimising the cost function by using a Gauss-Newton algorithm.

In the case of a cost function C' as described above, the optimisation corresponds to a minimisation of said cost function, and the determination of the optimisation gradient involves for example the determination of optimal PAN values $\hat{v}_{PAN}$ according to the following expression:

$$\hat{v}_{PAN(p,\delta\rho_{PAN})} = \underset{v}{\operatorname{argmin}}(C'(v, \hat{\rho}_{PAN(p)} + \delta\rho_{PAN}))$$

In such a case, for the pixel considered, the optimisation gradient near the simulated PAN reflectance provided by the scene model for the optimal MS values, designated by $(\partial\hat{v}/\partial\rho_{PAN})_{\rho=\hat{\rho}_{PAN(p)}}$, is for example determined according to the following expression:

$$\left(\frac{\partial\hat{v}}{\partial\rho_{PAN}}\right)_{\rho=\hat{\rho}_{PAN(p)}} = \frac{(\hat{v}_{PAN(p,\delta\rho_{PAN})} - \hat{v}_{MS(p)})}{\delta\rho_{PAN}}$$

Such an optimisation gradient is thus calculated, in the example considered, in each pixel in high spatial resolution.

B.4) Determining the Injection Vector

As illustrated by FIG. 3, the method 50 for increasing spatial resolution includes a step 53 of determining an injection vector representative of the variation in MS reflectance associated with the variation in PAN reflectance for the pixel considered, according to the scene model and the optimisation gradient. This step 53 of determining an injection vector is executed, in the example illustrated by FIG. 3, in each pixel of the oversampled MS image.

The injection vector for a pixel is, in preferred embodiments, calculated according to the optimisation gradient calculated for this pixel and according to a matrix of variation of the scene model. This variation matrix corresponds to the Jacobian matrix of the scene model at the optimal MS values calculated for the pixel considered, and is representative of the variation in MS reflectance with respect to the variation in the values of the parameters near the optimal MS values. Such a variation matrix is provided directly by the scene model, or can be determined on the basis of the scene model according to known methods.

The injection vector for a pixel p is for example calculated according to the following expression:

$$\left(\frac{\partial\rho_{MS}}{\partial\rho_{PAN}}\right)_{\rho=\hat{\rho}_{MS(p)}} = \left(\frac{\partial\rho_{model-MS}}{\partial v}\right)_{v=\hat{v}_{MS(p)}} \cdot \left(\frac{\partial\hat{v}}{\partial\rho_{PAN}}\right)_{\rho=\hat{\rho}_{PAN(p)}}$$

an expression in which:
- $(\partial\rho_{MS}/\partial\rho_{PAN})_{\rho=\hat{\rho}_{MS(p)}}$ corresponds to the injection vector calculated for the pixel p considered, having dimensions ($N_j \times 1$),
- $(\partial\rho_{model-MS}/\partial v)_{v=\hat{v}_{MS(p)}}$ corresponds to the matrix of variation of the scene model near the optimal MS values $\hat{v}_{MS(p)}$ for the pixel p considered, having dimensions ($N_j \times N_k$),
- $(\partial\hat{v}/\partial\rho_{PAN})_{\rho=\hat{\rho}_{PAN(p)}}$ corresponds to the optimisation gradient calculated for the pixel p considered, having dimensions ($N_k \times 1$), A∘B corresponds to the matrix product of the matrices A and B.

B.5) Low-Pass Filtering of the PAN Image

As illustrated by FIG. 3, the method 50 for increasing spatial resolution includes a step 541 of low-pass filtering of the PAN image, so as to obtain a PAN image with reduced spatial resolution.

The low-pass filtering of the PAN image allows to obtain a PAN image with reduced spatial resolution, that is to say an estimation of what the PAN image would have been if it had been acquired with the same spatial resolution as the MS image, then oversampled. Thus, the PAN image with reduced spatial resolution and the oversampled MS image have substantially the same spatial resolution.

The low-pass filtering is thus a spatial filtering of the PAN image. Preferably, the low-pass filter used is a Gaussian convolution filter representative of the effective spatial resolution of the MS bands, according to the Modulation Transfer Function (or MTF) of the optical observation instrument 11 in the MS bands.

B.6) Correcting the Oversampled MS Image

As illustrated by FIG. 3, the method 50 for increasing spatial resolution includes a step 542 of correcting the oversampled MS image according to the injection vectors calculated for each pixel, and according to the PAN image and the PAN image with reduced spatial resolution. The step 542 of correction allows to obtain the MS image with increased spatial resolution.

The step 542 of correction aims to transmit to the oversampled MS image high spatial resolution modulations observed in the PAN band with the PAN image. For this purpose, the step 542 of correction includes for example an estimation of the high spatial resolution modulation of the PAN reflectance, then a conversion of the high spatial resolution modulation of the PAN reflectance into high spatial resolution modulation of the MS reflectance. The high spatial resolution modulation of the MS reflectance can thus be added to the oversampled MS image to obtain the MS image with increased spatial resolution at the same spatial resolution as the PAN image, corresponding to the reality of the measurement and thus close to what it would have been if it had been acquired directly at the spatial resolution of the PAN image.

The high spatial resolution modulation of the PAN reflectance is for example estimated by comparing the PAN image to the PAN image with reduced spatial resolution. By designating by $\rho_{PAN(p)}$ the PAN reflectance of the pixel p of the PAN image, and by $\rho_{PAN\text{-}low(p)}$ the PAN reflectance of the pixel p of the PAN image with reduced spatial resolution, the high spatial resolution modulation $\text{mod}_{PAN(p)}$ of the PAN reflectance for the pixel p is for example calculated according to the following expression:

$$\text{mod}_{PAN}(p) = \rho_{PAN(p)} - \rho_{PAN\text{-}low(p)}$$

The high spatial resolution modulation of the MS reflectance is for example estimated according to the high spatial resolution modulation of the PAN reflectance and according to the injection vector. The high spatial resolution modulation $\text{mod}_{MS}(p)$ of the MS reflectance for the pixel p is for example calculated according to the following expression:

$$\text{mod}_{MS}(p) = \text{mod}_{PAN}(p) \times \left( \frac{\partial \rho_{MS}}{\partial \rho_{PAN}} \right)_{\rho = \rho_{MS}(p)}$$

By designating by $\rho_{MS\text{-}high(p)}$ the MS reflectance of the pixel p of the oversampled MS image, and by $\hat{\rho}_{MS\text{-}high(p)}$ the MS reflectance of the pixel p of the MS image with increased spatial resolution obtained after correction of the oversampled MS image, the correction of the oversampled MS image is thus carried out, in each pixel ($1 \leq p \leq N_p$), according to the following expression:

$$\hat{\rho}_{MS\text{-}high(p)} = \rho_{MS\text{-}high(p)} + \text{mod}_{MS}(p)$$

C) Embodiment on Pixels in Low Spatial Resolution

FIG. 4 schematically shows the main steps of a specific embodiment in which the scene portion considered corresponds to a pixel in low spatial resolution (at the sampling distance of the MS image), and in which the spatial resolution must be increased in the entire scene, that is to say that an injection vector must be calculated in fine for each pixel in high spatial resolution of the PAN image.

As illustrated by FIG. 4, the method 50 for increasing spatial resolution includes a step 55 of spatial undersampling of the PAN image in order to obtain a PAN image with a greater sampling distance, corresponding for example to that of the MS image, called "undersampled PAN image". Such a spatial undersampling can be carried out according to any method known to a person skilled in the art, and the choice of a particular method is merely an alternative embodiment. Preferably, the spatial undersampling includes a low-pass filtering of the PAN image corresponding to that which was described above in reference to FIG. 3, for the step 541 of low-pass filtering of the PAN image.

The step 55 of spatial undersampling of the PAN image is optional, and is present, in particular, if the PAN reflectance of the PAN image is used to optimise the scene model during the step 51 of determining the optimal MS values.

The method 50 for increasing spatial resolution then includes the steps 51 of determining the optimal MS values, 52 of determining the optimisation gradient and 53 of determining the injection vector which are executed for each pixel of the MS image. Everything that was described above in sections B.2, B.3 and B.4 also applies, the only difference being that the pixels considered are pixels in low spatial resolution here (at the spatial sampling distance of the MS image). By designating by $N_m$ the number of pixels in the MS image ($N_m < N_p$), $N_m$ injection vectors are thus calculated at first.

Each injection vector consists of $N_j$ injection coefficients respectively associated with the various bands of wavelengths of the MS bands (for example with the bands R, G, B and NIR). In each band of wavelengths of the MS bands, an elementary injection image, the $N_m$ pixels of which correspond to the $N_m$ injection coefficients calculated for this band of wavelengths, is therefore available. These $N_j$ elementary injection images together form an image of injection vectors.

As illustrated by FIG. 4, the method 50 for increasing spatial resolution includes a step 56 of spatial oversampling of the image of injection vectors, which aims to obtain an injection vector for each pixel in high spatial resolution. The step 56 of spatial oversampling of the image of injection vectors can implement, for example, a bilinear interpolation.

As illustrated by FIG. 4, the method 50 for increasing spatial resolution of the MS image also includes the steps 540 of spatial oversampling of the MS image, 541 of low-pass filtering of the PAN image and 542 of correction, which are identical to those described above in reference to FIG. 3 (sections B.4, B.5 and B.6).

D) Embodiment on Groups of Pixels in High Spatial Resolution

FIG. 5 schematically shows the main steps of a specific embodiment in which the scene portion considered corresponds to a group of pixels in high spatial resolution (that is to say the spatial resolution of the PAN image), and in which the spatial resolution must be increased in the entire scene, that is to say that an injection vector is calculated for each pixel in high spatial resolution of the PAN image.

The method 50 for increasing spatial resolution of FIG. 5 repeats all the steps described above in reference to FIG. 3.

As illustrated by FIG. 5, the method 50 for increasing spatial resolution further includes a step 57 of classifying the pixels of the oversampled MS image. Such a classification aims to group together the pixels, the MS reflectances of which are homogenous from the point of view of spectral behaviour.

In general, any classification criterion known to a person skilled in the art can be implemented, and the choice of a particular classification criterion is merely an alternative embodiment.

In particular, it is possible to use a vegetation criterion of the NDVI type (Normalized Differential Vegetation Index) by calculating, in each pixel, the NDVI index according to the expression $(\rho_{NIR}-\rho_R)/(\rho_{NIR}+\rho_R)$, an expression in which $\rho_{NIR}$ and $\rho_R$ correspond to the reflectances measured in the NIR band and the R band, respectively.

Alternatively or in addition, it is possible to use a criterion of average brightness level by calculating, in each pixel, the expression $\Sigma_{j=1}^{N_j} \rho_{MS,j}/N_j$. In such a case, it is possible to also use the reflectance of the PAN image for the classification, by considering that $(N_j+1)$ different bands of wavelengths are available, and that the PAN reflectance $\rho_{PAN}$ of the PAN image corresponds to the reflectance measured in the $(N_j+1)$-th band of wavelengths.

It is thus possible to group together the pixels that have close NDVI indices and/or that have close average brightness levels.

At the end of the step 57 of classification, a number $N_g$ of groups of pixels ($N_g \geq 1$) is therefore available. In general, an injection vector is thus calculated for each group of pixels, and the injection vector calculated for a group of pixels is used for all the pixels of this group. Consequently, the steps 51 of determining the optimal MS values, 52 of determining an optimisation gradient and 53 of determining the injection vector are no longer executed for each of the $N_p$ pixels, but for each of the $N_g$ groups of pixels, which allows in principle to greatly reduce the quantity of calculations to be carried out. During the step 51 of determining the optimal MS values for a group of pixels, the parameterisation of the scene model is for example optimised with respect to a reference MS reflectance, representative of the MS reflectances of the various pixels of the group of pixels considered. For example, the reference MS reflectance of a group of pixels corresponds to a median value or to an average value of the MS reflectances of the group of pixels considered. In the case in which the PAN band is also used during the step 51 of determining the optimal MS values, in the same way it is possible to consider a reference PAN reflectance which can be a median value or an average value of the PAN reflectances of said group of pixels considered.

Once an injection vector has been determined for each group of pixels, given that the injection vector determined for a group of pixels is used for all the pixels of this group of pixels, an injection vector is available for each pixel of the oversampled MS image, to be used during the step 542 of correction.

E) Embodiment on Groups of Pixels in Low Spatial Resolution

FIG. 6 schematically shows the main steps of a specific embodiment in which the scene portion considered corresponds to a group of pixels in low spatial resolution (that is to say at the spatial resolution of the MS image), and in which the spatial resolution must be increased in the entire scene, that is to say that an injection vector must be in fine calculated for each pixel in high spatial resolution of the PAN image.

The method 50 for increasing spatial resolution of FIG. 6 repeats all the steps described above in reference to FIG. 4.

As illustrated by FIG. 6, the method 50 for increasing spatial resolution further includes a step 57 of classifying the pixels in low spatial resolution of the MS image, which is identical to the step 57 of classification described in reference to FIG. 5 for the pixels in high spatial resolution.

As indicated above, the step 55 of spatial undersampling of the PAN image is optional, and is present, in particular, if the PAN reflectance of the PAN image is used to optimise the scene model during the step 51 of determining the optimal MS values, or in the step 57 of classification.

At the end of the step 57 of classification, a number $N_g$ of groups of pixels ($N_g \geq 1$), which can vary from one image to another, according to the scene observed, is thus available. Everything that was described above in reference to FIG. 5, with regard to the steps 51 of determining the optimal MS values, 52 of determining the optimisation gradient and 53 of determining the injection vector, also applies in the present case. Once an injection vector has been determined for each group of pixels, given that the injection vector determined for a group of pixels is used for all the pixels of this group of pixels, an injection vector is available for each pixel in low spatial resolution.

Thus, an image of injection vectors at the spatial sampling distance of the MS image, which is oversampled during the step 56 to obtain an injection vector for each pixel of the oversampled MS image, to be used during the step 542 of correction, is available.

In an example of representation of a system for implementing the method 50 (FIG. 7), a device 6 comprises:
- one or more processing units consisting for each of them of one or more processors 61, for example such as microprocessors, capable of executing the steps of the method 50 in at least one of its embodiments;
- storage resources 62 such as one or more memories of the ROM (for Read-Only Memory) or RAM (Random-Access Memory) type;
- a user interface 63, capable of allowing an input of information by a user, for example such as the selection of the MS and PAN images to be used, of the identifiers of processing methods and/or of the required levels of precision, and a communication of information to the user;
- communication means 64 for example such as one or more wired or wireless receivers and/or connections to one or more networks, capable of receiving and/or transmitting data for example such as relating to the MS and/or PAN images;
- viewing means 65, capable of displaying MS and/or PAN images, for example such as one or more screens.

In alternative embodiments, at least a part of the processing units, of the storage resources and/or of the viewing means are outsourced.

F) Other Alternatives of the Method for Increasing Spatial Resolution

More generally, it should be noted that the embodiments considered above have been described as non-limiting examples, and that other alternatives are therefore possible.

In particular, the method has been described while considering that the increase in spatial resolution aimed to obtain an MS image with increased spatial resolution at the same spatial resolution as the PAN image. Nothing excludes, according to other examples, considering for the MS image with increased spatial resolution a spatial resolution lower than that of the PAN image. For example, in the case of an optical observation instrument of the SPOT 6/SPOT 7 type, the spatial resolution of the MS image is approximately 6 metres, whereas the spatial resolution of the PAN image is approximately 1.5 metres. In such a case, it is also possible to increase the spatial resolution of the MS image to obtain an intermediate spatial resolution, for example of approximately 2.5 metres. If necessary, it is for example possible, in a manner that is in no way limiting, to previously undersample the PAN image to obtain an undersampled PAN image, brought to the desired spatial resolution for the MS image, that is to say 2.5 metres.

The present method 50 for increasing spatial resolution can be executed in an automated manner without the intervention of an operator at any step whatsoever. The present method 50 for increasing spatial resolution can be implemented in a non-limiting manner, according to the operational context, in a ground station 20 for direct reception of satellites images, in an independent software suite dedicated to the processing of satellite or aerial images, or be integrated into a distributed processing chain for image-processing services of the cloud services type. The present method 50 for increasing resolution, according to any one of its embodiments, can thus be executed by a processing system consisting of a processing device as described above, or by a processing system including several processing devices connected to each other.

The invention claimed is:

1. A method for increasing a spatial resolution of a multispectral (MS) image using a panchromatic (PAN) image having a spatial resolution greater than the spatial resolution of the MS image, the MS image comprising pixels representative of a MS reflectance of a scene, the PAN image comprising pixels representative of a PAN reflectance of said scene, comprising, for at least a portion of said scene:
   obtaining a set of values of parameters of a scene model, said scene model simulating a reflectance of the portion of said scene in bands of wavelengths corresponding to the MS image and to the PAN image to respectively provide simulated MS reflectance and simulated PAN reflectance, according to hypotheses associated with parameters on the portion of said scene, said set of values of parameters being obtained according to a resemblance between the simulated MS reflectance and the MS reflectance for the portion of said scene;
   determining a relative variation in the simulated MS reflectance with respect to the simulated PAN reflectance near said set of values of parameters;
   estimating a difference between the PAN reflectance and a reflectance of a PAN image with reduced spatial resolution, the difference being referred to as a high spatial resolution PAN modulation; and
   determining an MS image with increased spatial resolution, by adding to the MS reflectance a correction corresponding to a product of said high spatial resolution PAN modulation and said relative variation.

2. The method of claim 1, wherein in estimating said high spatial resolution PAN modulation, the PAN image with reduced spatial resolution has a spatial resolution corresponding to the spatial resolution of the MS image.

3. The method of claim 1, wherein, for the portion of said scene, obtaining said set of values of parameters comprises an optimized parameterisation of said scene model with respect to the resemblance between the simulated MS reflectance and the MS reflectance.

4. The method of claim 1, wherein the determination of the MS image with increased spatial resolution comprises:
   a spatial oversampling of the MS image so as to obtain an oversampled MS image;
   low-pass filtering of the PAN image so as to obtain a PAN image with reduced spatial resolution; and
   correction of the oversampled MS image in the portion of said scene according to said relative variation and said high spatial resolution PAN modulation.

5. The method of claim 1, wherein the determination of said relative variation in the simulated MS reflectance with respect to the simulated PAN reflectance comprises:
   determining a gradient of values of parameters of said scene model with respect to the simulated PAN reflectance near a reference simulated PAN reflectance corresponding to said set of values of parameters;
   determining a variation in the simulated MS reflectance according to values of parameters near said set of values of parameters; and
   composing said variation in the simulated MS reflectance and said gradient of values of parameters, providing said relative variation in the simulated MS reflectance with respect to the simulated PAN reflectance.

6. The method of claim 5, wherein, for the portion of said scene, the determination of said gradient comprises an optimized parameterisation of said scene model with respect to a resemblance between the simulated PAN reflectance and a vicinity of the reference simulated PAN reflectance.

7. The method of claim 6, wherein said optimized parameterisation comprises, for the portion of said scene considered, an optimization of a cost function comprising:
   a reflectance function representative of a resemblance between the vicinity of the reference simulated PAN reflectance and the simulated PAN reflectance for the values of parameters considered; and
   a function of a priori knowledge representative of a resemblance between the values of parameters considered and an a priori knowledge of parameters of the scene model.

8. The method of claim 7, wherein the a priori knowledge of the parameters of the scene model is a function of said set of values of parameters.

9. The method of claim 1, wherein the portion of said scene corresponds to a pixel and said relative variation is determined for each pixel.

10. The method of claim 1, wherein pixels being classified into groups of pixels and the portion of said scene corresponding to one of said groups of pixels, said relative variation is determined for each group of pixels.

11. The method of claim 10, wherein said relative variation of a group of pixels is determined according to a median value or an average value of the MS reflectances of the group of pixels considered.

12. The method of claim 1, wherein the scene model comprises a model of reflectance on the ground and an atmospheric model.

13. The method of claim 1, further comprising a previous conversion of the values of the pixels of the MS image and the values of the PAN image respectively into values of MS reflectance and values of PAN reflectance on the ground or at a top of the atmosphere.

14. A computer program product recorded on a non-transitory media executable by a processor, comprising a set of program code instructions to implement a method for increasing spatial resolution of claim 1.

15. An image processing system to process image by increasing a spatial resolution of a multispectral (MS) image using a panchromatic (PAN) image having a spatial resolution greater than the spatial resolution of the MS image, the MS image comprising pixels representative of a MS reflectance of a scene, the PAN image comprising pixels representative of a PAN reflectance of said scene, the image processing system comprises at least one processor configured, for at least a portion of said scene, to:

obtain a set of values of parameters of a scene model, said scene model simulating a reflectance of the portion of said scene in bands of wavelengths corresponding to the MS image and to the PAN image to respectively provide simulated MS reflectance and simulated PAN reflectance, according to hypotheses associated with parameters on the portion of said scene, said set of values of parameters being obtained according to a resemblance between the simulated MS reflectance and the MS reflectance for the portion of said scene;

determine a relative variation in the simulated MS reflectance with respect to the simulated PAN reflectance near said set of values of parameters;

estimate a difference between the PAN reflectance and a reflectance of a PAN image with reduced spatial resolution, the difference being referred to a high spatial resolution PAN modulation;

determine an MS image with increased spatial resolution, by adding to the MS reflectance a correction corresponding to a product of said high spatial resolution PAN modulation and said relative variation; and wherein said at least one processor is configured to implement the method for increasing the spatial resolution of claim 1.

* * * * *